United States Patent [19]
Oberdeck et al.

[11] 4,299,637
[45] Nov. 10, 1981

[54] METHOD OF MAKING A GAME TICKET

[75] Inventors: Martin K. Oberdeck, Jacksonville, Fla.; John R. Koza, 2575 Peachtree Rd. NE., #24C, Atlanta, Ga. 30305

[73] Assignee: John R. Koza, Atlanta, Ga.

[21] Appl. No.: 915,382

[22] Filed: Jun. 14, 1978

[51] Int. Cl.[3] ........................ B32B 31/12; B42D 15/00

[52] U.S. Cl. ........................................ 156/64; 156/67; 156/253; 156/277; 156/289; 156/291; 273/139; 283/6; 283/8 R; 283/9 R; 283/12 A; 427/7; 427/157; 427/258; 427/288; 428/43; 428/916; 434/346

[58] Field of Search ................... 156/64, 67, 253, 277, 156/289, 290, 291; 283/6, 8 R, 9 R, 12 A; 427/7, 258, 288, 157; 428/43, 916; 273/139; 35/9 R; 434/119, 346

[56] References Cited

U.S. PATENT DOCUMENTS

| | | | |
|---|---|---|---|
| 2,961,777 | 11/1960 | Neville et al. | 35/9 R |
| 3,900,219 | 8/1975 | D'Amato et al. | 283/6 |
| 4,095,824 | 6/1978 | Bachman | 273/139 X |
| 4,174,857 | 11/1979 | Koza | 283/6 |

FOREIGN PATENT DOCUMENTS

| | | | |
|---|---|---|---|
| 1185066 | 3/1970 | United Kingdom | 283/6 |

*Primary Examiner*—Robert A. Dawson
*Attorney, Agent, or Firm*—Curtis, Morris, & Safford

[57] ABSTRACT

A method for making a game ticket, such as for example a lottery ticket, is disclosed in which the ticket has a base sheet and a cover sheet adhesively joined together in peripheral portions of sections containing information used in the game. The cover sheet, along with other materials placed on the base sheet, conceals the information to be used in the game and prevents undetected tampering with the ticket. The ticket is formed from a base sheet on which information to be concealed is printed, and a release coating is deposited over predetermined areas of the previously printed information. Thereafter an opaque material is applied over the release coating to conceal the information in the printed areas, which opaque material is adapted to be rubbed off when the ticket is used. Thereafter the non-transparent cover sheet is adhered to the base sheet along predetermined areas surrounding the sections of the base sheet defining individual tickets.

18 Claims, 9 Drawing Figures

METHOD OF MAKING A GAME TICKET

The present invention relates to a method for forming game tickets in which the ticket information cannot be observed without destroying the integrity of the tickets. This method is particularly suited for use in forming lottery tickets of the instant lottery type.

Lotteries have become increasingly popular and one type of lottery is known as the "instant lottery". An instant lottery is generally one where the purchaser of the ticket is able to determine immediately whether or not he has obtained a winning ticket. Usually, winning is determined by removing a covering of some kind to gain access to concealed information. For example, the uncovered information may indicate that the holder of the ticket is entitled to a money prize.

One of the key problems with lottery tickets is to insure that an unscrupulous person is not able to examine the tickets before distribution to the public and determine which tickets are winners and which are losers. One type of ticket which overcomes these problems is disclosed in U.S. Patent Application Ser. No. 865,202 filed Dec. 28, 1977, now U.S. Pat. No. 4,174,857; the disclosure of which is incorporated herein by reference as though fully set forth herein. That ticket is considered to be secure against all known means of viewing the concealed information without actually opening the ticket. Essentially, the ticket disclosed in that application includes a cover and base sheet with concealed information placed on the base sheet within peripheral portions of the sheet that are adhesively fixed together. The information is placed on a central portion of the ticket and a postage stamp perforation tear line is applied to both the base sheet and the cover sheet. The tear line is positioned between the area where the information is placed and the peripheral portion where the two sheets are adhesively joined together. By using the postage stamp perforation, if someone attempts to pull the two sheets apart, each of the sheets would separate at the tear line and indicate to the purchaser that the ticket had been tampered with; or the resulting misalignment of the perforation holes would indicate that other methods of opening had been used. It is a further security measure that the sheets are preferably made from a laminate of paper and metallic foil, with the metallic foil acting as a barrier to prevent concealed information from being observed by applying a strong light to the ticket. In addition, the paper layer of the laminate when adhesively joined to the metallic sheet, would destructively delaminate if someone attempted to pry the sheets apart.

The present invention provides a method by which tickets of the above described type can be formed in a continuous process, commencing with a blank or preprinted sheet, and ending with a series of tickets. The invention contemplates provision for continuous inspection of the sheet from which the tickets are to be formed, so that misprinted or improperly formed sections of the base sheet are never validated and are removed from the sequence of validated tickets, before distribution and sale thereof.

It is an object of the present invention to provide a method for continuously forming game tickets which are not susceptible to tampering.

Another object of the present invention is to form game tickets, by a continuous process, that require a definite act on the part of the ticket purchaser to gain access to concealed information, so that the purchaser may be sure that the ticket has not been compromised.

A further object of the present invention is to provide a method for making game tickets which is relatively simple and inexpensive in operation.

A still further object of the present invention is to provide a method for forming game tickets which insures against inadvertent distribution or sale of tickets containing printing or other marking errors.

In accordance with an aspect of the present invention, game tickets of a type adapted to be used in lottery games and the like are formed by depositing at least one layer of a release coating material over printed areas of previously printed information to be concealed on a base sheet. The printed information contains the game information as well as instructional information or the like. The game information is applied to the ticket through computer controlled printing devices which are programmed to apply predetermined sequences and/or combinations of numbers or other information to the base sheet. The latter is provided in a long continuous form, and the game information for individual tickets is printed in discrete sections of the base sheet, which will later be subdivided into the individual tickets. After the release coating is placed over the game information an opaque material is printed on top of the release coating to conceal the information printed on the base sheet beneath the release coating. Thereafter a non-transparent cover sheet is adhered to the base sheet on the side thereof containing the printed information with a predetermined adhesion pattern about the peripheries of each of the separate sections or tickets on the base sheet, so that all of the printed information in the ticket sections is concealed from view by the overlying cover sheet. After the cover sheet is adhered to the base sheet, the combination base and cover sheet are perforated along the adhesion pattern to permit separation of the individual tickets, and it is also perforated within each of the ticket sections of the base sheet, inside of the peripheral adhesion pattern, to permit the purchaser to remove the cover sheet from the base sheet after he purchases a ticket.

The above, and other objects, features and advantages of this invention will be apparent in the following detailed description of an illustrative embodiment thereof, which is to be read in connection with the accompanying drawings, wherein:

FIGS. 1A, 1B, 1C and 1D, constitute a composite sequence of a schematic illustration showing the various printing and operating stations of a device adapted to perform the method of the present invention; at the various operating stations, enlarged side sectional and plan views, of the base sheet, showing the material printed thereon is provided;

Figure 1A:
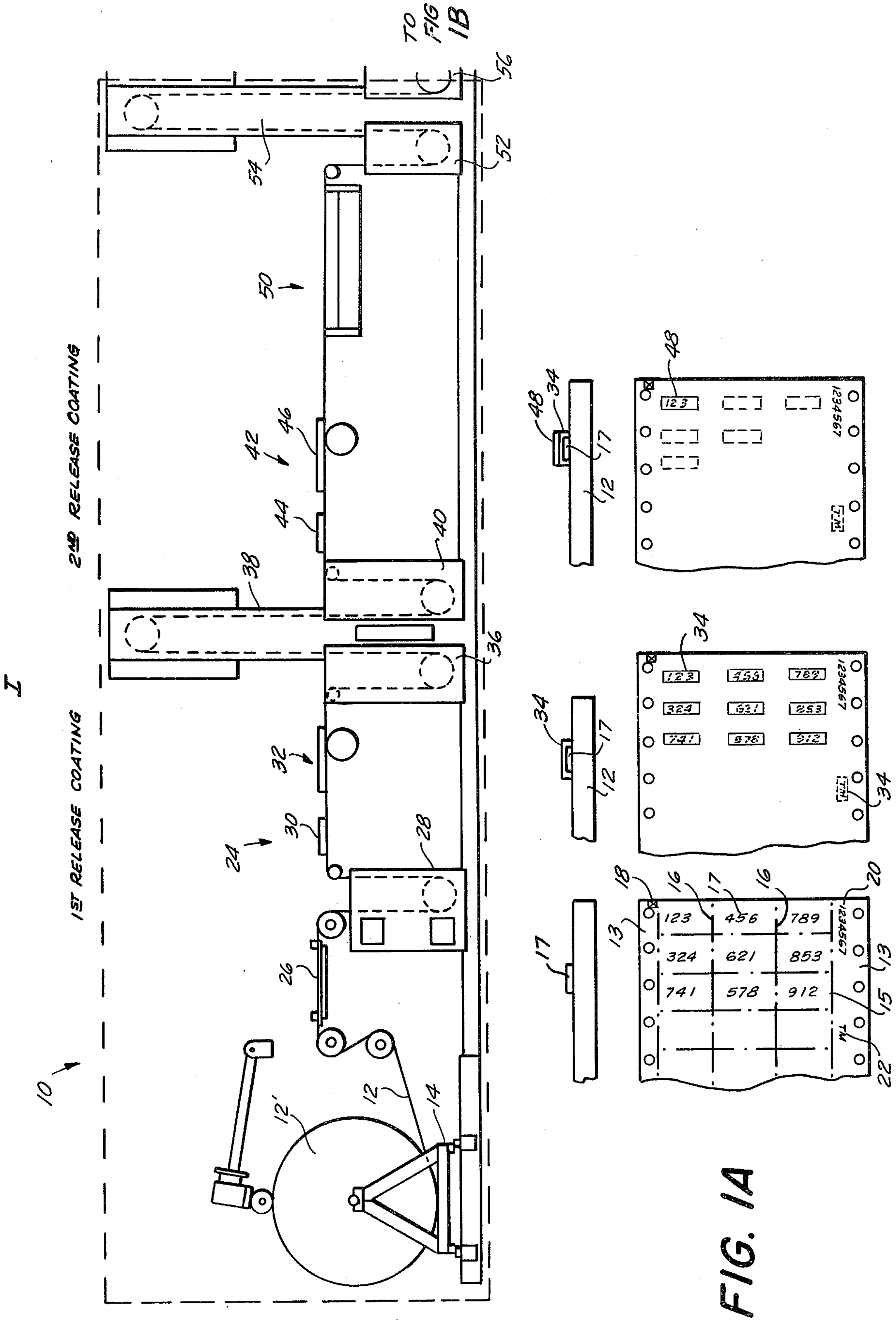

Referring now to the drawings in detail, and initially to FIGS. 1A–1D, a machine 10 adapted to perform the method of the present invention is illustrated. This machine is constructed and operated to form individual lottery tickets from a continuous web of base sheet material 12 (e.g. a roll or a folded web or the like) mounted on a support frame 14 at one end of the apparatus or dispensed from packs. In the illustrative embodiment a roll 12' is provided which is preprinted with the ticket information, primarily the information to be concealed from view for use during the game, although alternatively, as described hereinafter, web 12 may be a blank sheet and a printing station or stations may be positioned adjacent the roll 12' before the web enters the device 10, in order to print the game information and the like thereon.

In one embodiment of the invention the paper or base sheet web 12 has a 10½ inch width, so that three channels or strips of 3 inch tickets can be formed therefrom. As illustrated in FIG. 1A, below web 12, the sheet material has a pair of perforated outer side channels 13 which are ½ inches wide and which accommodate computer pin feeds that move the base sheet through some parts of the apparatus and aid in maintaining registry between the various printing stations thereof. In addition, a ½ inch record margin 15 is provided on one side of the sheet on which certain code information is printed, as described hereinafter, to maintain a record of the tickets printed and formed by the apparatus. Between these margins the remaining 9 inch strip of the paper permits three rows of tickets having a 3 inch width to be formed.

Preferably apparatus 10 prints the base sheet, as described hereinafter, in steps of 17 inch repeats, i.e. it prints in segments of the base sheet having a length of 17 inches. Thus the apparatus will print ten tickets having a length of 1.7 inches, in each channel, or a total of thirty tickets, during each step. Alternatively, it is contemplated that by varying the dimensions of the apparatus used to perform the method a base sheet having a width of 13½ inches can be utilized so that four channels of ten tickets of size 1.7 inches × 3 inches can be printed at one time rather than three.

In one embodiment of the invention base sheet 12 consists of a single flat sheet of paper or the like used to form the tickets. Alternatively, web 12 may be a laminate of paper and foil laminated together, or two paper layers laminated on opposite sides of a foil. The bottom layer serves to prevent viewing of the information printed on the base layer through the back of the ticket. In addition, where impact type printers are used to print information on the base sheet, the base layer will tend to conceal the impact impressions from view through the back of the base layer. In this regard, the terms "impact printer" and/or "impact type printer", as used herein are intended to refer to computer printers, letter presses, and other numbering devices wherein the printed information is applied to the base sheet with the impact of a character.

As mentioned, in one embodiment of the invention base sheet or web 12 is preprinted with the game information to be concealed thereon. Thus, as illustrated in FIG. 1A, digital numerical information 17, used in playing the game, is already printed on the web in predetermined sections 16, each of which will form a separate game ticket. In addition, the base sheet has a cue mark 18 printed in the upper ½ inch computer pin margin and a "mileage" number 20 printed in the record margin, along with an optional test mark letter or letters 22. A single mileage number is printed for each ten ticket or 17 inch repeat in the record margin. The cue mark is printed adjacent the forward edge of the first ticket in each repeat for registration of the subsequent printing apparatus in the device of the invention.

The mileage number is typically a 13-digit number which is associated in a computer memory with the tickets in its repeat, so that should a repeat fail to be validated during the course of the manufacturing procedure, the computer memories controlling the printing operation can determine how the non-validation influenced the odds of the game being manufactured.

As described in the above mentioned co-pending application, the game tickets have information to be concealed printed thereon, such as for example game numerals, as illustrated in FIG. 1A. Over the game numerals one or more release coatings are applied, which are in turn overprinted with an opaque rub off material to conceal the game numerals from view. Thereafter, the rub off is overprinted with a predetermined design to designate on the tickets the location of the information concealed. After the base sheet is overprinted, it is covered by a metallic layer which is adhered to the periphery of each ticket so that the information printed on the ticket cannot be viewed by optical means. The disclosed apparatus performs each of the printing steps necessary to apply these various materials to the base sheet and to assemble the ticket with the cover sheet. In addition the apparatus perforates the continuous web of sheet material so that the tickets can be separated into individual tickets and further perforates the individual tickets so that the cover sheet can be removed therefrom when the ticket is to be used.

Referring again to FIG. 1A, web 12 has the information to be concealed printed thereon, e.g. digits 17. This is illustrated in side view in FIG. 1A or an enlarged scale, for convenience in understanding. The web 12 enters the apparatus at a first release coating station 24, which includes a splicer 26 that enables the operator of the device to splice one web or roll of paper to another as the webs become depleted. The splicer is followed by a paper "dancer" 28. The dancer accumulates and feeds out the continuous web, and acts as a buffer between the stepwise movements of the successive printing stations. A number of such dancers are used throughout the apparatus, as described hereinafter, between the print stations. These dancers are of conventional construction and need not be described in detail. They are available from a number of different companies, such as for example, the press style TLD machine sold by General Research Corp. of Sparta, Mich.

Dancer 28 is followed in the first print station 24 by a registration unit 30. The registration unit serves to insure that the printed information on each repeat along the length of the paper sheet is positioned in registry with the material to be printed on the sheet at those same locations, in each of the successive printing stations. Each of the printing stations in the apparatus has such a registration unit. This arrangement insures that proper registration between the various printing steps in the device is maintained. The registration unit itself is of conventional construction and is available from a variety of commerical sources, including General Research Corp. of Sparta, Mich. and Gerhard Klemm Maschinenfabrik of Bielefield, Germany.

Immediately following the registration unit a printing unit 32 is provided. This printing unit may, for example, be a silk screen unit, or it may be a flexographic or gravure printer. Such printers are commercially available from Ferd. Ruesch A. G. of Switzerland makers of the Gallus Press; C. A. Nielsen and Petersens of Denmark, makers of the Nilpeter Press, and General Research Corp. In the first station 24, a release coating 34 is applied over the information to be concealed on the base sheet. This first release coating can either be an area coating, as illustrated in plan view of the base sheet immediately below station 24, wherein all of the numbers to be concealed are covered with a single broad area covering or, each individual digit or number in the game may be separately coated with its own small area coating. Alternatively the release coating can be applied as a predetermined pattern of benday dots as described hereinafter. In any case, the release coating is applied to overlie the digits or game information to be concealed. In addition a release coating is placed over the test spot 22.

The release coating is typically a transparent material, such as for example a varnish or silicone base material, and is provided to permit a concealment coating, applied later in the process, to be removed when the game ticket is utilized. After this release coating is applied, the paper is drawn through the apparatus, as a result of the operation of the registration units in the apparatus, through a dancer 36, and from the dancer to a drying tower 38. The drying tower is also of conventional construction and serves to cure the paper and also dry the release coating 34 applied thereto.

From drying tower 38 the paper passes through a further dancer 40 into the second release coating station 42. This station includes a registration unit 44, similar to the other registration units, which insures that the predetermined areas on which printing is to take place on the base sheet are maintained in registry at each print station. This registration unit can be a computer pin type registration unit, a slit type registration unit or an electric eye unit, as is known to those skilled in the art.

From registration unit 44 web 12 passes a printer 46, which is similar to the printer 32 previously described. This printer unit applies a second release coating 48 over the information to be concealed, in substantially the same area as the release coating 34 previously applied. The pair of release coatings are transparent and serve to protect the computer printed images (i.e. the game information to be concealed 17) on the base sheet to insure that these images are not rubbed away by the player when the concealment coating is removed. They also serve to allow easy removal of the rub off coating when the game is played. Moreover, the two release coatings are advantageous where the base paper sheet is porous and rough, since they insure proper coating of the printed information and proper rub off of the concealment coating.

From the printer unit 46 web 12 immediately enters an inspection station 50. As mentioned, the paper moves in a stepwise sequence and an inspector at the station 50 can observe each printed repeat, to determine whether there are any printing errors either in the computer printed game information to be concealed, or in the application of the release coatings. The inspector also observes the status and appearance of the paper web itself, to determine whether any tears or cuts are present therein which would be unsatisfactory for use in forming lottery tickets. If an unsatisfactory repeat or portion of a repeat is noted, the inspector marks the paper web so that the invalidation mark can be detected at a later stage of the process.

From the inspection station the paper web enters a dancer 52, drying tower 54, and dancer 56, to dry the second release coating. From dancer 56, the paper enters a first rub off print station 58.

Figure 1B:
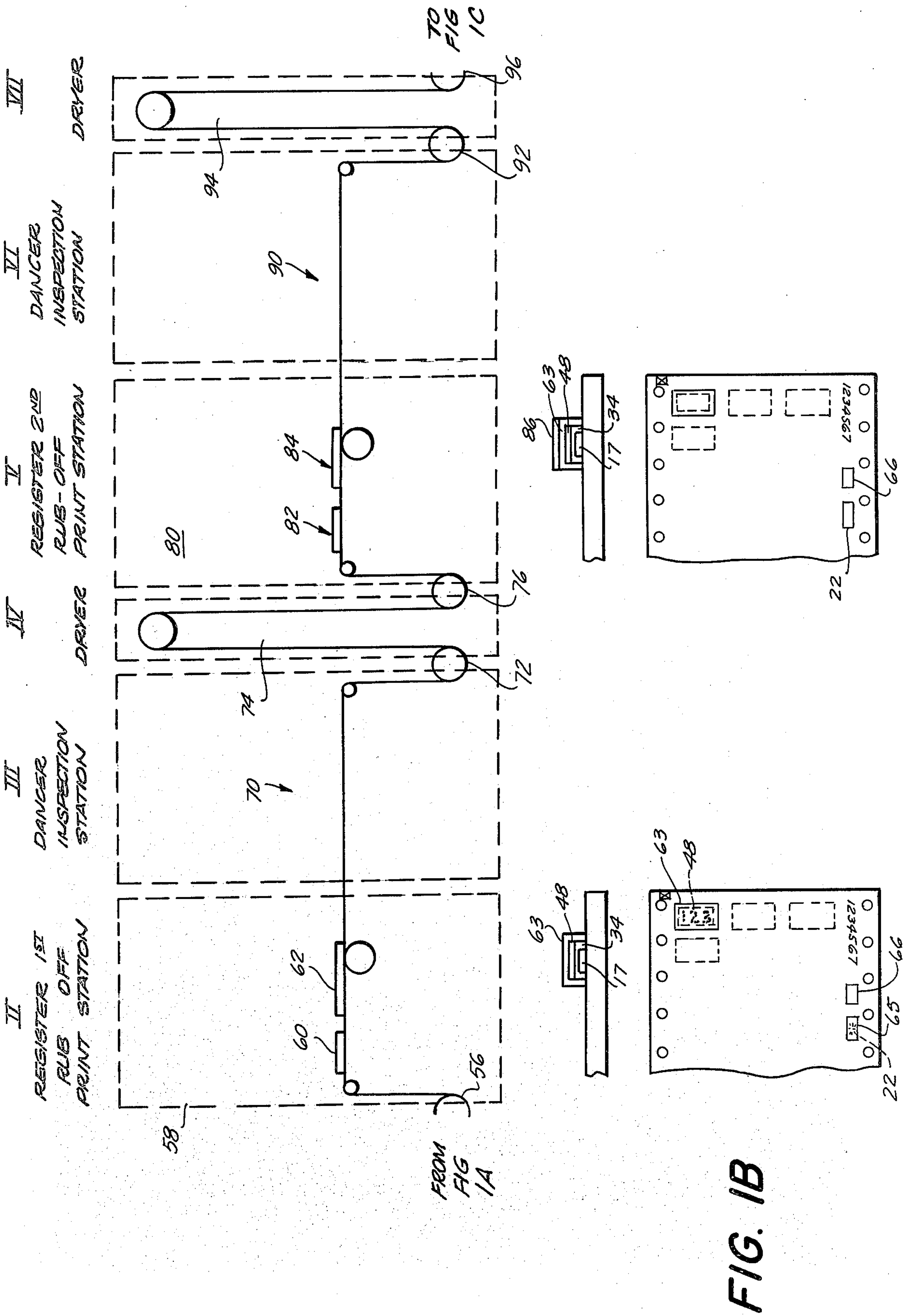

Station 58 includes a registration unit 60, and a printing apparatus 62, similar to those previously described. This printing unit applies a first opaque rub off coating 63 over the release coatings previously applied on the base sheet. The rub off coating has a somewhat larger area than the release coating, as illustrated in FIG. 1B immediately below the first rub off print station, so that the rub off will bind to the paper layer 12 along the edges of the rub off area. The rub off or concealment coating may be formed of cellulose acetate and latex compositions. Preferably the silk screen printing unit has a relatively coarse screen to create a bumpy coating of uneven thickness for the rub off. The bumpy surface given to the rub off coating forms an interface to be used with a second rub off coating applied in the next step of the process, to disperse light and make it extremely difficult if not impossible to see concealed information through the concealment coating even under extremely high intensity or infrared lighting conditions.

At the rub off print station 58 a rub off test spot 65 is also laid down on the record margin, over the optional test spot 22 and the release coatings previously applied thereto; and a second test spot 66, over a non-release coated portion of the record margin, is also printed.

From the first rub off print station, the paper web passes to an inspection station 70. At this inspection station (which may simply be a flat surface over which the paper web passes) an operator checks the registration printing of the first rub off coating with the predetermined printed information 17 of the ticket, and he can also test the two test spots 22, 66 to determine whether the rub off properly rubs off the release coating in the test spot 22 and also to determine whether the rub off adheres to the paper properly and prints properly, in test spot 66. If the printing is improper or if any other defect appears in the ticket the operator marks the record margin, as described above.

After passing inspection station 70, web 12 enters a dancer 72, drying tower 74 and dancer 76, before entering a second rub off print station 80. This print station, as with the other print stations, includes a registration unit 82 that may be responsive to mark 18 and a printing unit 84. This printing unit is also a silk screen unit and is adapted to apply a second opaque rub off concealment coating 86. This concealment coating is placed directly on the rub off coating applied in the prior print station. This print station also applies the second rub off coating over the test spots 22, 66 in the margin. These test spots are intended to be removed from the ticket when the game ticket is used. The temperature of the dryers through which the rub off coatings pass during the remainder of the process is controlled so that the rub off materials do not "cook" to such an extent that they will not rub off even from the release coating material.

From print station 80 the paper sheet passes to another inspection station 90. At this station an operator may observe the sheet passing therethrough to determine whether any damage has occurred in the sheet material at the various prior printing stations, and he may also check the rub off coatings applied in the prior print station, on the test spots 22, 66 to determine whether they have been properly printed and whether their consistency is satisfactory. Again, if some defect is found he marks the web, as described above. From this inspection station the paper sheet passes through a further dancer 92, drying tower 94 and another dancer 96.

Ater dancer 96 the paper enters into a further print station 98. This print station also includes a registration unit 100 and a printing device 102. At this station an overprint 104 is applied over the rub off coating. Preferably this overprint consists of a series of predetermined patterned images 106 placed over each of the numerals or characters in the information now concealed, in order to provide an identification as to the spots at which concealed information are located on the ticket, so that the purchaser knows where to rub the ticket in order to expose the concealed information. Spots 106 are preferably printed to overhang the rub off coating and release coatings, and adhere to the paper along their edges. Also, at this same station, additional non-concealed information 107 may be printed on the ticket as desired. The inks used with this overprint, are preferably materials compatible with the rub off materials, which will not soften the rub off but absorb into the rub off in a manner similar to an ink dispersing into chalk. At the same time an overprint is printed on the test spot 22, for later inspection.

From print station 98 the paper sheet passes to a further inspection station 110. At this inspection station an operator observes the paper sheet to determine whether it has been damaged and also to determine whether the overprint 104 has been applied in proper registration with the rub off. He may also test the test spot 22, to determine whether the overprint rubs off with the rub off to expose the concealed information. Again, if some imperfection is found he marks the web with a mark that could be machine readable in "OCR" or "OMR" equipment.

Figure 1C:
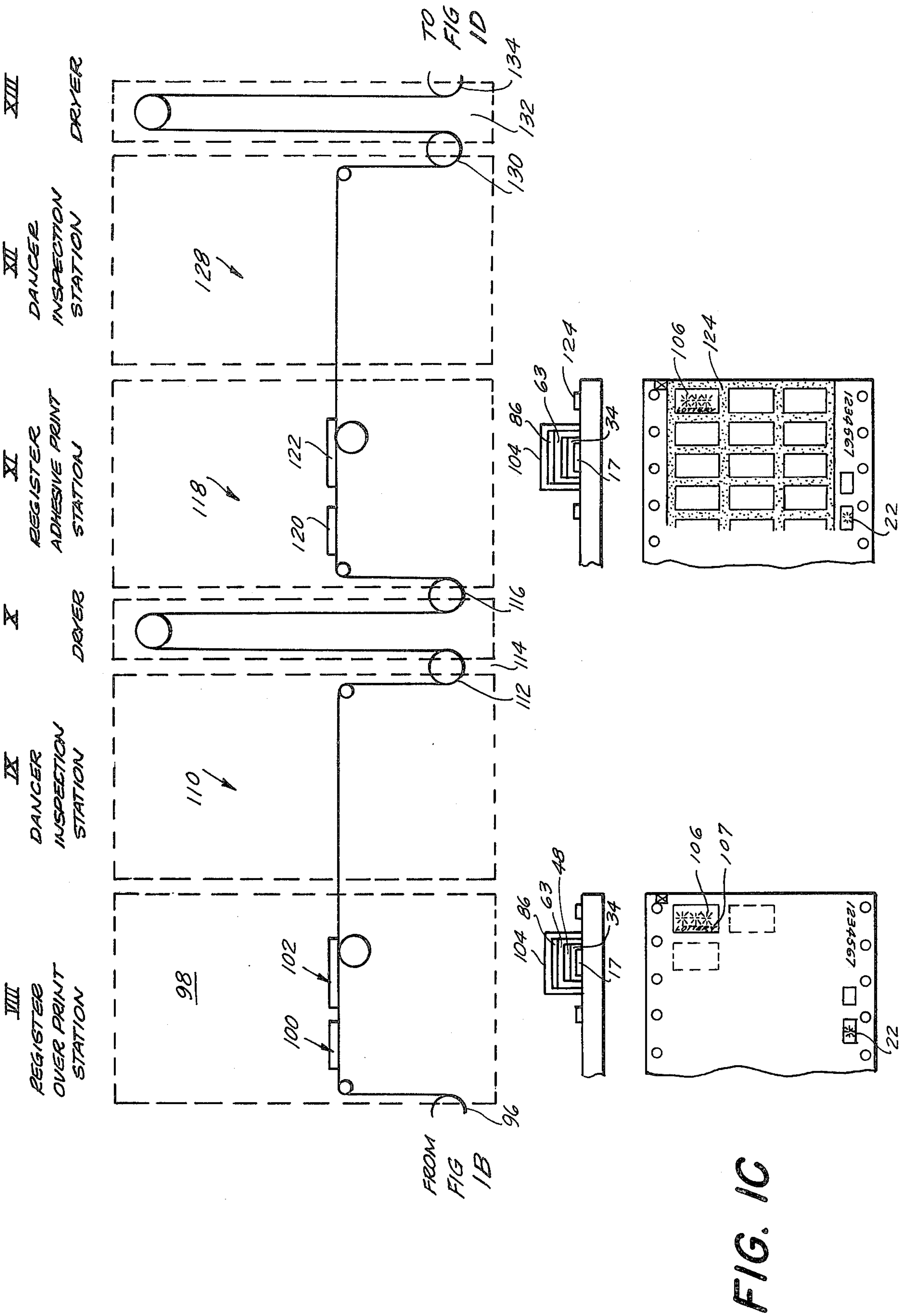
Figure 1D:
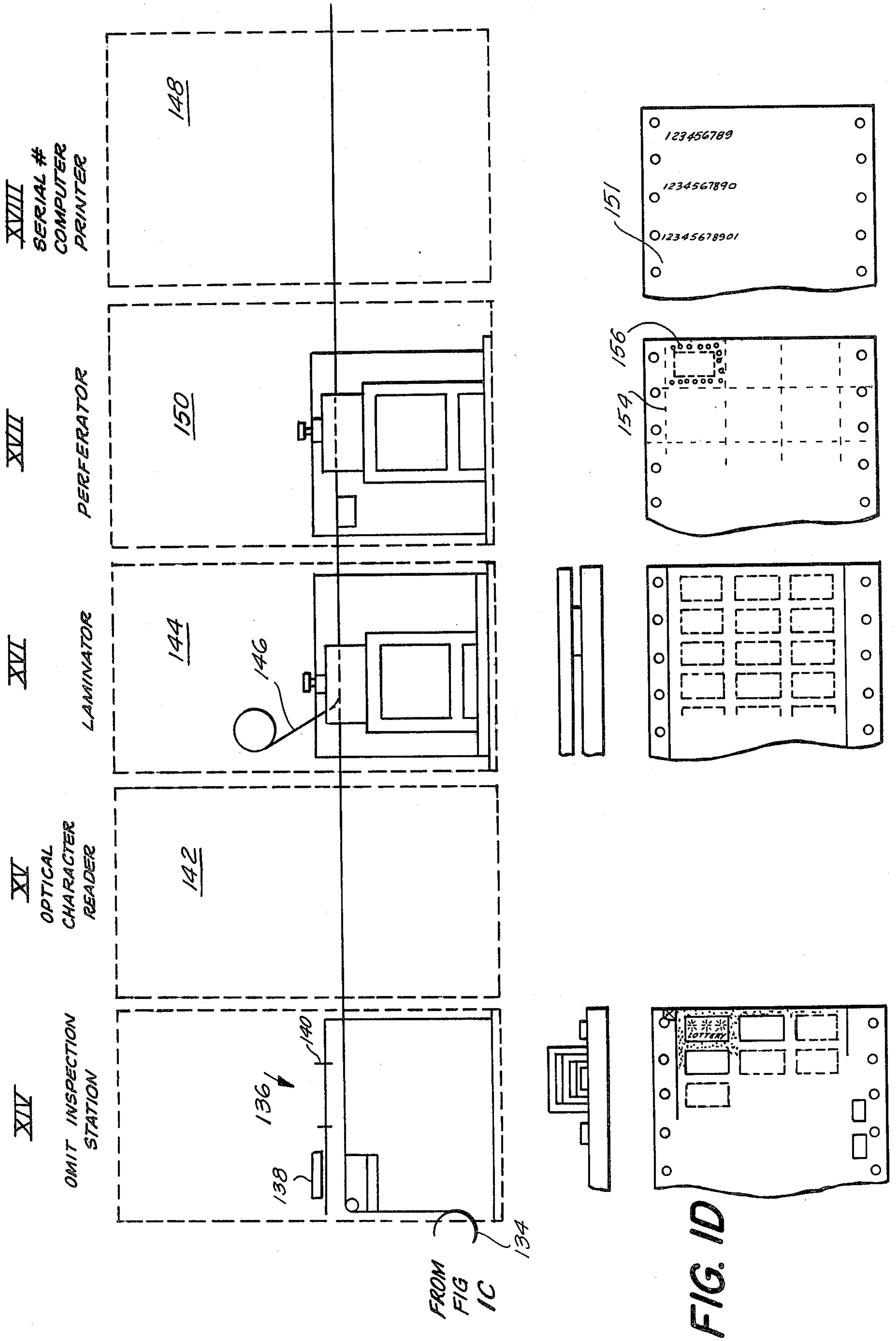

From inspection station 110 the web passes through a dancer 112, drying tower 114 and dancer 116 into an adhesive print station 118. This station includes a register 120 and print unit 122. The print unit here may also be a silk screen unit. This silk screen unit is adapted to apply to each repeat along the sheet paper an adhesive pattern around the periphery of ticket sections 16, to define the individual tickets. Preferably the adhesive applied here is a self-curing pressure sensitive adhesive. As seen in FIG. 1C the adhesive pattern 124 is a generally rectangular pattern surrounding each of the ticket sections 16 containing the concealed information 17.

From this print station the paper web or sheet passes to a further inspection station 128, where an operator can again observe the paper sheet passing therethrough to determine whether it has been damaged, and whether the adhesive pattern 124 has been properly applied around the ticket sections 16. In this regard it is noted that preferably the adhesive is formed with a visible color, to facilitate inspection at this station. If desired, test inspection station 110 can be eliminated and the observation performed there can instead be performed at station 128 so that a single observer will then observe the adhesive pattern as well as the quality and registration of an overprint 104.

From inspection station 128 web 12 passes dancer 130, drying tower 132 and dancer 134 into an omit inspection station 136. While all of the other inspection stations previously described in the system of the present invention are optionally manned, this inspection station should always be manned to insure that each repeat of the printed sheet is given a final inspection. This omit station includes a registration unit 138, which moves the web into position for inspection between a pair of blinders 140 mounted in the inspection station in any convenient manner. The blinders 140 are spaced so that a single repeat print on the sheet is positioned between the blinders during each registration step. Thus the operator observes a whole repeat, and only a whole repeat, during his inspection procedure. If a repeat has a reject mark on it from an inspection made at a previous station, or if the inspector sees some new damage or an inadequacy in the print on the repeat, the inspector informs the computer controlling the operation of the validation device that this repeat is to be omitted. This is performed by pushing a button on the computer, which also controls an optical character reader 142. The optical character reader is of conventional construction and is adapted to read the mileage number of the record margin of the base sheet. The OCR is a conventional and commercially available device sold for example by Recognition Equipment Corp. It is located at a predetermined number of repeats from the omit inspection station blinders.

When this omit inspection station operator signals that a section is to be omitted, the computer controlling the validation operation is enabled to detect from the OCR reader input the mileage number on the rejected repeat. Thus, for example, if the optical character reader is located at five repeats after blinders 140, the computer tells the optical character reader to read the fifth repeat after the omit button has been pushed by the operator, and to provide that information to the computer. The computer then knows that the repeat bearing the mileage number read by the OCR must not be validated.

From the OCR reader web 12 enters a laminator 144 which laminates a top layer or cover sheet to the base sheet. This cover sheet is preferably a metallic foil 146 which is applied through the laminator 144 to the side of the base sheet having the adhesive pattern 124 applied thereto so that the laminate is adhered to the base sheet. This laminate may have information printed thereon, such as for example the game name and game rules. The laminator would include a registration unit to insure proper registration between the roll of cover sheet material 146 and the base sheet. Alternatively, the cover sheets can be applied to each repeat on the base sheet as individual sheets, by conventional laminating apparatus. As another alternative, the roll sheet 146 can be applied without printing to the base sheet at the laminate and a subsequent printing apparatus provided immediately following the laminator for printing on the top or cover sheet the game name, rules, and other information as desired.

As the web leaves laminator 144, the base sheet 12 is covered by cover sheet 146; and the concealed information 17, covered by the various release coatings and rub offs, is concealed from view. This opaque metallic foil is a shield for the information and prevents it from being read by the use of strong light or other devices which might permit one to view the information 17. In this regard it is noted that the adhesive coating preferably has an adhesive strength which is greater than the tear strength of the layers of the base sheet or of the metallic foil of the cover sheet. In this manner, if any attempt is made to separate the cover and base sheets they will tear at the adhesive coating, i.e. they will destructively delaminate, providing a visual indication that the ticket has been previously opened and possibly tampered with.

From laminator 144 the web enters a perforator 150. This perforator forms a series of perforations 152, such as for example postage stamp perforations or crush type perforations, along and through the adhesive pattern 124, transverse to the web so that the individual ticket strips can be separated from each other. In addition, perforator 150 provides a series of perforations 156 on each of the tickets inwardly of the adhesive pattern 124 which will permit the cover sheet to be separated from the ticket when the ticket is to be used. As described in the above mentioned patent application this series of postage stamp perforations 156 is preferably formed on three sides of each ticket about ¼ of an inch from the ticket's edge inwardly of the adhesive layer beneath the cover sheet and the base sheet.

After exiting the perforator, the web enters a serial number computer printer 148. This printer prints on the bottom 151 of the base sheet, i.e. on the side of the sheet opposite the metallic foil, a serial number for each of the tickets. This serial number may take any desired form depending upon how the computer is programmed and the bookkeeping system kept by the operator and issuing agency. The serial number computer printer however is also keyed to the OCR and the computer, and is spaced from the optical reader a known number of repeats, so that when a voided or invalidated repeat, noted by the OCR, enters the serial number computer printer, no serial number is printed on the tickets of that repeat, but rather a word such as "void" or "invalid" is printed thereon. Thus that repeat is not "validated" with a validation number.

After passing through the serial number computer printer, the web passes through a conventional fan fold unit (not shown) which will slit the tickets into strips cutting through the vertical or longitudinal portions of the glue pattern 124 and fan fold the tickets. It will also trim off the ½ inch pin feed margins, and the record margin, which may be stored if desired. An inspector is provided at the fan fold unit to note the repeats which have been marked "invalid" by the serial number computer printers, and these repeats are manually removed and destroyed.

Figure 2:
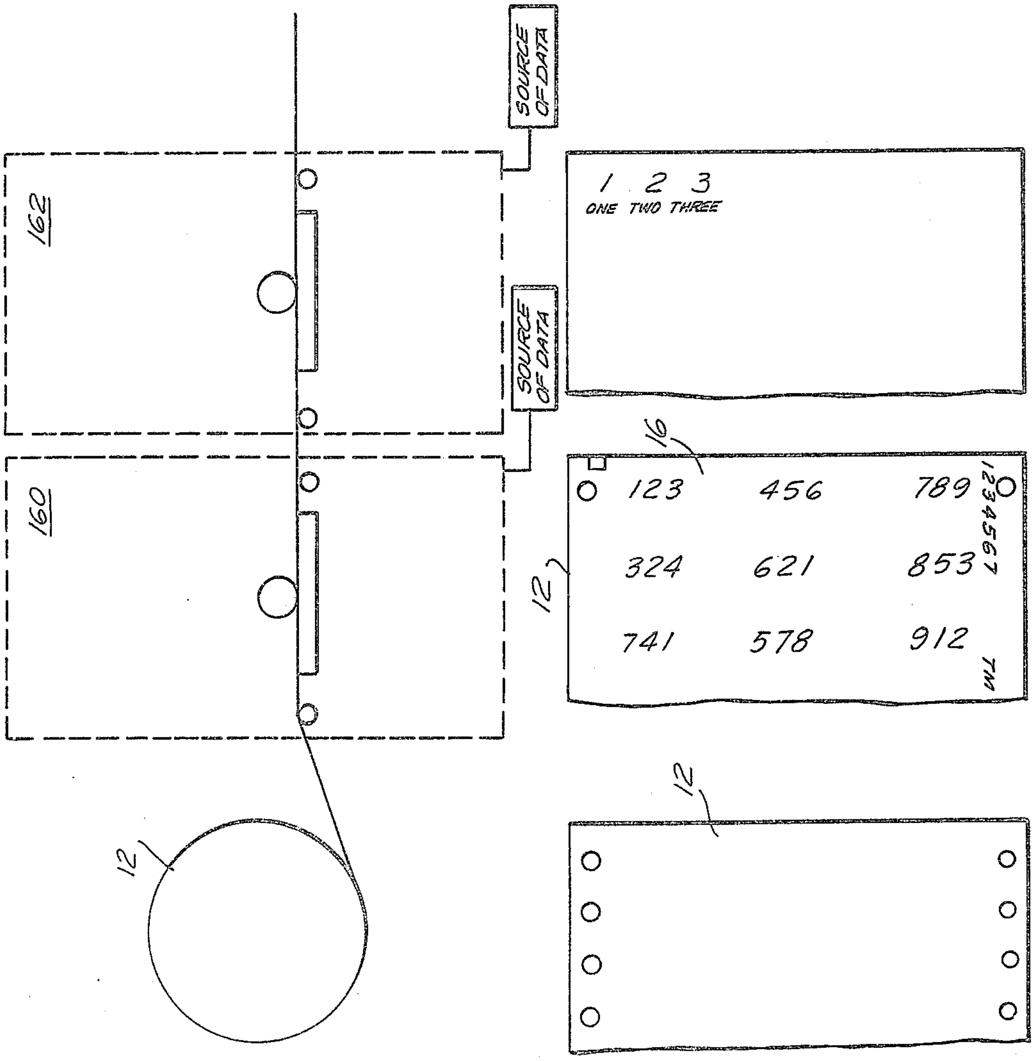
FIG. 2 is a schematic side view of the operation in which the game information is printed on the ticket containing below each of the stations illustrated therein a plan view of the base sheet containing the printed information.

As mentioned in the illustrative embodiment of the invention shown in FIG. 1, roll 12 is preprinted with the information to be concealed. However, if desired, a printing unit can be placed between the roll 12 and the first release coat printing station 24, as illustrated in FIG. 2, in order to print the information to be concealed on the paper sheet. In accordance with a feature of the invention, this printing arrangement is performed by two separately controlled computer printers 160, 162 which are programmed to print the same information on the same print repeats, but in alpha and numeric forms. That is, for example, the computer printer 160 is provided to print the information to be concealed in accordance with a predetermined sequence or program on the base sheet 12 in each of the ticket sections 16 in numerical form, as illustrated. From this print unit the paper enters the second print unit 162 which is adapted to print the same information from a different print command but in alphabet form in a different type style. That is, as illustrated in FIG. 2 the printer 162 prints the word for the representative of the individual numbers immediately beneath the numbers. The written form of the word is referred to herein as alpha printing.

It has been found that in printing lottery game tickets or commercial games very high reliability is required in the concealed information printed on the ticket. Because prizes of large value are awarded by these tickets incorrect lottery symbols, even if rare, could be disastrous. Generally, to avoid such problems, the numbers printed on the tickets are printed in numerical form with the word representation for the number printed immediately therebelow in order to provide a double check on the number. If the number does not match the alpha representation thereof, the ticket is automatically voided.

While computer printers used to print lottery tickets heretofore have generally good reliability, transient failures are inherent, and often undetectable. Such failures may for example consist of an error in printing one or more of the digits of the concealed information to be printed on the ticket. This may convert a losing ticket to a winning ticket or, a winning ticket to a losing ticket. If such an error occurs in conventional printing arrangements, which normally only print the number once, it is not detectable to visual observation because the single number when viewed appears to be correct, and only by physically checking against the number that actually should have been printed on each specific ticket can the error be detected.

With the present invention, this reliability problem is essentially solved by imprinting the number and its corresponding alpha symbol at different instances in time, with the number being printed first and the alpha symbol or caption being printed second, or vice versa. The two printers are independently operated, so that one prints the numbers and the other prints the corresponding alpha characters. Therefore, in this case, if one of the printers has a transient failure so that it misprints information, this will readily be discernible in the completed ticket because the number and its alpha character or caption will not correspond. This is readily visibly observed and there is no need to check the number against any master lists of tickets. All that the operator does is void the repeat in which the error occurs, so that the repeat is not used to form valid tickets.

While this portion of the invention has been described particularly with reference to the use of computer printers, it is to be understood that the same printing process can be achieved with any type of variable image printing device.

In addition to improving the reliability in printing of computer tickets, this system improves the speed at which the tickets can be printed. This results because the two lines (numbers and alpha captions) are printed at separate stations, at the same speed so that each printer prints only one half of the lines of information. If a single printer were used to print all the lines, it would take that one printer longer to print the same information. By printing the information on the alternate lines on successive machines the effective rate of printing is increased, e.g. almost doubled. This feature of the invention is suitable to any printing application and not just game tickets. For example in printing any page of information, by using two successive printers to print alternate lines of type the total time of printing the information is nearly halved, as compared to the time necessary for a single machine to print the entire page.

In the illustrative embodiment of the invention six separate print stations are provided so that the game tickets can be printed in a continuous run. However it is contemplated that the same process can be performed with less than six printers by passing the web through the printers in two separate runs. For example, in another embodiment of the invention four print units are used and in the first pass throught the apparatus the first two printers (corresponding to printers 3 and 46) print the first and second release coats while the other printers remain inoperative. In the second pass through the apparatus the first and second printers are utilized to print the rub off coatings and the third and fourth printers used to overprint and apply adhesive (corresponding to stations 98 and 118). Alternatively three printers and two passes or two different printers and three passes, etc. can be used.

Figure 4:
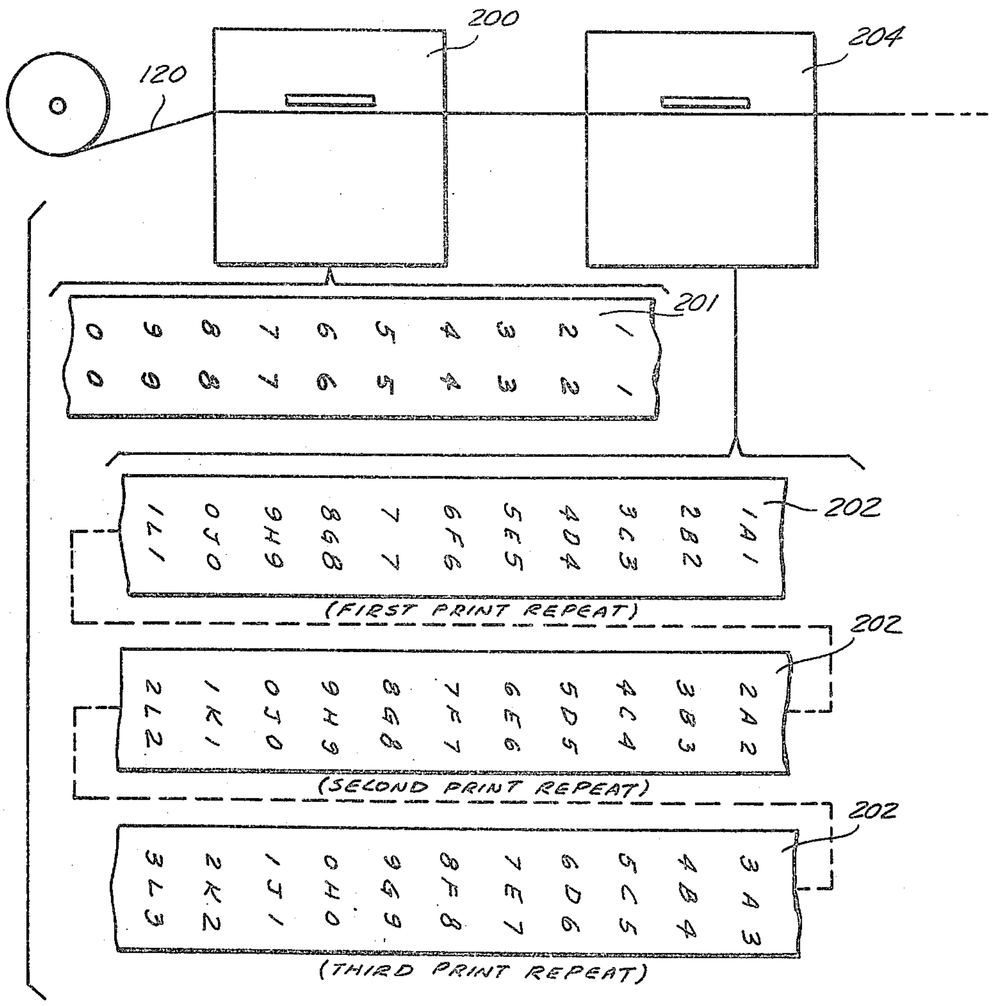
FIG. 4 is a schematic side view of another printing method adapted to print variable game information according to a predetermined pattern, showing beneath each of the printing stations therein a schematic illustration of the appearance of a ticket strip or channel after the printing operations performed thereby.

In lieu of using variable image printers for printing game information on the web 12, this information can also be printed on each ticket area using fixed image screen print units to obtain the variable ticket information (i.e. the varying game numbers). For example, by using a first screen print unit that prints part of the ticket numbers for ten of the 1.7 inch length tickets per repeat on a first pass and a second screen print unit to print the rest of the game information on a second pass, but in eleven ticket repeats, then one hundred and ten running tickets would be printed before the two patterns or sequence of numbers would be repeated. For example, as shown in FIG. 4, a blank web 120 is passed through a first printer 200 (e.g. a silk screen unit) having a fixed number pattern adapted to print ten 1.7 inch long tickets in one repeat 201. One ticket strip 202 is shown for illustrative purposes below the printer, but as in the prior embodiment the web may be three or four strips wide. The screen of this unit has a fixed array of numbers comprising a portion of the game information which is repeated in the same position on each print repeat on web 120.

A second printing unit 204 is also provided which receives the web from printer 200, but which is arranged to print an eleven ticket repeat. The screen of this unit also has a fixed array of game information, which is located to complete the game information printed on the first printer. This array, in the illustrative embodiment comprises the second column of letters, shown in the ticket strips 202 below printer 204 in FIG. 4. This completes the three number game information for each ticket. Of course it is to be understood that the number array patterns on the screen need not be those illustrated but can be any desired array.

With this arrangement the first print of the second print unit prints eleven tickets; ten from the first repeat of the first printer and one from the second repeat of the first unit. Thus the next print of the second unit will cause the tickets to bear the numbers shown in the drawing for the second strip printed and the third print repeat the array for the third strip printed etc. Thus the two fixed arrays on the screen printer units will produce a predetermined sequence of patterns which will be repeated every one hundred and ten tickets (10×11).

By repeating this procedure, for example by using three printers, one for each column of numbers, letters or symbols, with the third printer printing twelve ticket repeats, the interval between repetitive patterns can be dramatically increased. Preferably print units which are adapted to vary their printed repeat length are ideally suited for this procedure. Such units are commercially available and need not be described here in detail. After the game information is printed in this manner on web 120 it can be passed through the other stations of the previously described apparatus for coating with the release coatings, rub offs, overprints, adhesive, etc.

Another problem arising in the printing of legal lottery or commercial game tickets with concealed images arises with the use of impact printers, i.e. computer printers, mechanical numbering heads, and the like in which the sheet material is struck by a character image, leaving a visible impression on the back surface of the sheet material. This image creates a problem in that it may be possible for individual winning tickets to be picked out by closely observing the back of the ticket, even though the information is concealed on the front. One way of avoiding this problem is to adhere a heavy cardboard backing strip to the printed sheet material, as described.

Also, the impression created may cause the covering material over the image to show the impact, or it may be possible to read the image using chemical or optical means because the image is made up of a definite amount of deposited material, namely ink.

Figure 3:
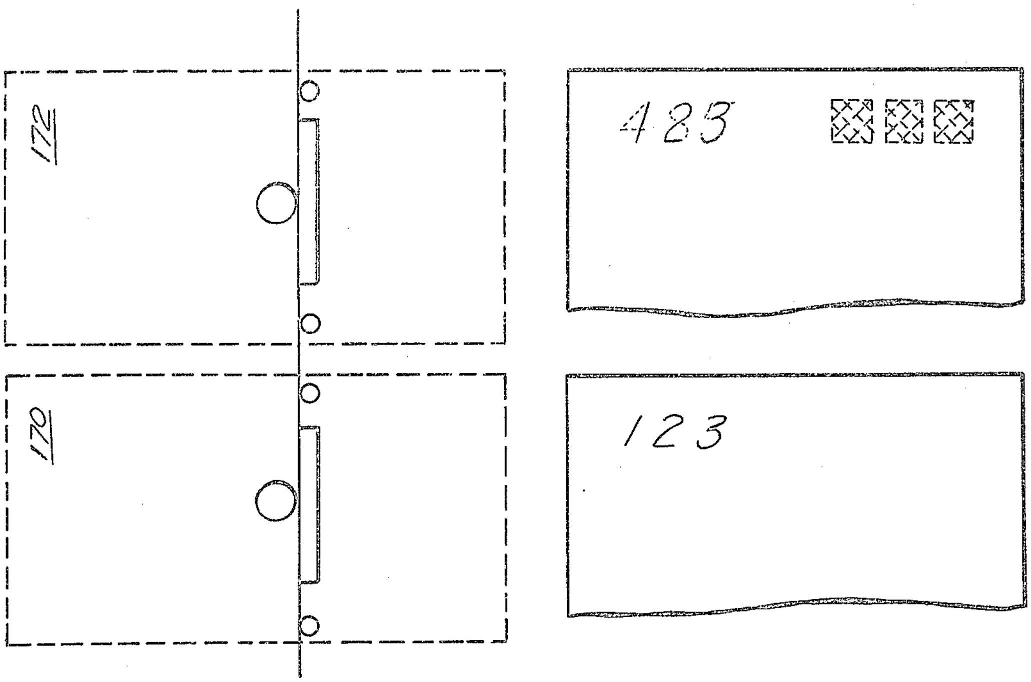
FIG. 3 is a schematic side sectional view of another printing method, adapted to be used in accordance with the present invention, showing beneath each of the printing stations therein a schematic illustration of the appearance of the base sheet after the printing operation.

In accordance with the present invention this problem is avoided by using two printing units 170, 172 which are of identical construction. The first printer 170 prints the information to be concealed in the usual way (actually printer 170 may consist of the two printing units 160, 162 previously described). This is schematically illustrated in FIG. 3 below the printing station 170, wherein a series of tickets are shown and printed on the base sheet with game numerals. The printing of these numerals will leave an impression on the back of the stock which must be suppressed. In accordance with the present invention, the stock is then passed through a second printer (actually a third printer when printing units 160, 162 are in use) 172 at which the numerals are overprinted with a symbol that conceals the imprint of the originally printed numbers. This symbol can be computer generated to be a number other than the actual number printed in the printer 170 and preferably this is a complementary number. That is, it is a number selected such that the two numbers together, if both were inked, would be any of two or preferably more than two possible symbols or numbers. For example, in the illustration in FIG. 3 the first series of numbers 123 have been illustrated as being overprinted with the numbers 4, 8 and 5.

Alternatively, as illustrated with the second series of numbers in FIG. 3, a common pressure confusion symbol can be printed with the printer 172, to suppress the impression made by the previously printed number. In either case, a confusion pattern based on pressure is created. Of course, it is to be understood that the printer 172, operates without ink.

In another form of the invention, printer 172 can be provided with a transparent ink of density similar to the ink used in the first printer 170. This will create a deposit of material that results in confusing the material deposited by the visible readable ink with the overprinted transparent ink. This deposit of materials creates a confusion pattern, as well as the impressions, if any, made by the two printers 170, 172.

Another method, according to the present invention, of providing the game ticket with a confusion pattern to prevent compromizing of the ticket consists of using a benday printed confusion pattern before or after the game information is placed on the web 12. This benday pattern preferably consists of a number of irregularly shaped elements printed in at least two and preferably three different intensities so that the benday provides a confusion pattern around the game information and reduces the contrast between the game information and the web to give the ticket a greater integrity.

Figure 5:
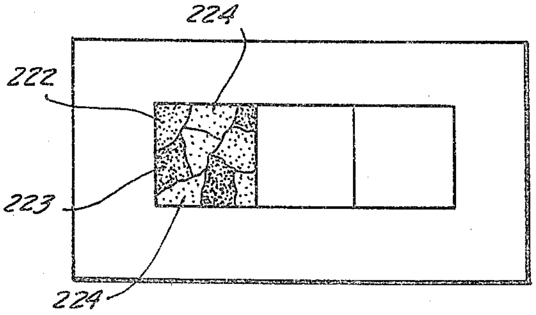
FIG. 5 is a plan view of a game ticket printed with a benday confusion pattern according to the present invention.
Figure 5A:
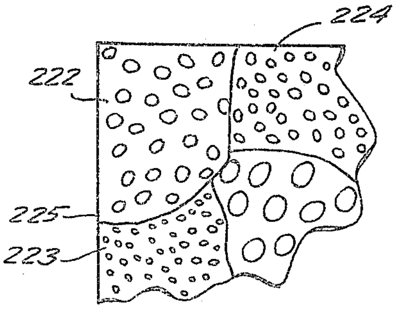
FIG. 5A is an enlarged view of a portion of the benday pattern shown on the ticket of FIG. 5.

As shown in FIG. 5 the irregularly shaped element 230 in the benday pattern is printed on web 12 in the area of the ticket in which the game information is to be printed, in three different intensities (222,223,224), with parts 225 (see FIG. 5A) surrounding the irregularly shaped elements not printed at all. The irregularly shaped elements may be of the same color or they may be printed in different colors. The difference in the intensity of the elements may be due to a different ink being used for different elements and the ink varying in hue or saturation (i.e. in the number of Ben Day dots used in each element) or the difference in intensity may be due to a different thickness of ink being applied to different elements.

The density of each element may vary, for example, each element may be mottled or stippled instead of having a plain uniform density but the appearance of adjacent elements should be substantially different.

The benday pattern may be printed to overlie the game information printed on the ticket but preferably it is printed immediately upon the web 12 so that it will underlie the later printed game information. In this way, the benday pattern can also be used as a registration aid when printing the information onto the device.

Alternatively the benday confusion pattern of the present invention can be used to print one of the release coatings, e.g. the release coating applied at station 42, using a material that is transparent to the eye but visible under infrared lighting. For example the release coating may contain a suitable conventional fluorescent material so that when an attempt is made to compromise or "break" the ticket using infrared techniques the benday release coating creates a confusion pattern obscuring the game information.

Accordingly, it is seen that by the present invention a method is provided for continuously forming lottery or game tickets which are essentially incapable of being compromised. The process is performed relatively rapidly and conveniently, so that it is inexpensive. In addition, it provides for an accurate printing and constant review and inspection of the printing process, so that unsatisfactory game tickets are not inadvertently sold.

Although an illustrative embodiment of the present invention has been described herein with reference to the accompanying drawings, it is to be understood that the invention is not limited to that precise embodiment, and that various changes and modifications may be effected therein by one skilled in the art without departing from the scope or spirit of this invention.

What is claimed is:

1. The method of making game tickets and the like comprising the steps of depositing a release coating over predetermined areas of previously printed information on a base sheet; thereafter depositing over said release coated areas of the base sheet an opaque coating material to conceal the information printed in said areas; and thereafter adhering a non-transparent cover sheet to said base sheet along predetermined areas surrounding said predetermined areas of printed information; and perforating said adhered cover and base sheets through said areas at which they are adhered to permit the composite sheet to be severed into individual tickets which are peripherally sealed by the adhered cover and base sheets; inspecting the base sheet before said cover sheet is adhered thereto, to determine whether said base sheet and the material thereon are properly formed and printed to produce game tickets; and after said cover sheet is adhered to said base sheet, printing ticket validation information on the base sheet for those areas of the sheet determined in said inspection step to be properly formed or printed.

2. The method as defined in claim 1 wherein said step of depositing a release coating comprises the steps of separately applying first and second layers of release coating material to said predetermined areas of previously printed information.

3. The method as defined in claim 2 wherein at least one of said release coatings includes a fluorescent material therein.

4. The method as defined in claim 2 wherein said step of applying an opaque material comprises the steps of separately applying first and second layers of opaque material to said release coating.

5. The method as defined in claim 1 including the step of first printing information to be concealed on predetermined areas of said base sheet.

6. The method as defined in claim 5 wherein said printing step comprises printing said information with an impact-type printer and thereafter printing over the printed information with a concealment impact pattern using no visible ink.

7. The method as defined in claim 5 wherein said printing step comprises the step of printing with a fugitive ink.

8. The method of making a game ticket and the like comprising the steps of depositing at least one layer of release coating material over predetermined areas of previously printed information to be concealed on a base sheet; said information being printed in a predetermined pattern in discrete sections of the base sheet wherein each section defines a separate ticket; depositing over said release coated areas an opaque coating material to conceal said information printed within said predetermined areas; thereafter applying an adhesive coating in a predetermined adhesion pattern on the side of the base sheet containing said printed information about the peripheries of each of the separate sections of the base sheet; then inspecting said base sheet to determine whether said base sheet and the materials and coatings applied thereto are properly formed and positioned for use in completed game tickets; and thereafter placing a non-transparent cover sheet on said base sheet for adhesion thereto by said adhesive coating whereby all of the printed information in said sections is concealed from view by the overlying cover sheet; printing ticket invalidation information on the composite base and cover sheet for those areas of the sheet determined in said inspection step to be improperly formed or printed.

9. The method as defined in claim 8 including the steps of inspecting said sheet after said step of depositing said release coating to determine whether the printed information and the release coating on the sheet are satisfactory for use in forming a completed game ticket.

10. The method as defined in claim 8 wherein said step of depositing a release coating material comprises the steps of successively depositing at least two separate layers of release coating material over said predetermined areas.

11. The method as defined in claim 8 wherein said step of depositing an opaque material comprises the steps of depositing at least two layers of opaque material over said release coated areas.

12. The method as defined in claim 10 wherein said step of depositing an opaque material comprises the steps of depositing at least two layers of opaque material over said release coating areas.

13. The method as defined in claim 12 including the step of inspecting said sheet at least after depositing the last of said layers of opaque material to determine whether the opaque material was applied in a manner sufficient to permit the sheet to be used in forming a completed game ticket.

14. The method as defined in claim 8 including the step of overprinting said opaque material with a predetermined visible indicia pattern before said adhering step to provide a visible indication as to the location of the concealed information.

15. The method as defined in claim 8 including the step of perforating said adhered cover and base sheets along said areas at which they are adhered to permit the composite to be severed into individual tickets.

16. The method as defined in claim 15 including the step of printing said information to be concealed on said sections of said base sheet before applying said release coating thereto.

17. The method as defined in claim 15 wherein said information consists of numerical and corresponding alpha information and said printing step comprises the steps of printing said numerical information at one station with one printing device and said alpha information at a second station with a second printing device.

18. The method as defined in claim 17 wherein said printing step comprises printing said information with an impact-type printer and thereafter printing over the printed information with a concealment impact pattern using no visible ink.

* * * * *